United States Patent [19]

Anthony

[11] 4,391,771

[45] Jul. 5, 1983

[54] ARRANGEMENT FOR RETAINING A FUEL ROD IN A RECONSTITUTABLE FUEL ASSEMBLY

[75] Inventor: Andrew J. Anthony, Tariffville, Conn.

[73] Assignee: Combustion Engineering, Inc., Windsor, Conn.

[21] Appl. No.: 212,375

[22] Filed: Dec. 3, 1980

[51] Int. Cl.³ .......................... G21C 3/10; G21C 3/12
[52] U.S. Cl. ..................................... 376/451; 376/440; 376/446
[58] Field of Search ............... 376/434, 436, 438, 440, 376/441, 442, 451, 453, 457, 446

[56] References Cited

U.S. PATENT DOCUMENTS 4,295,935  10/1981  Anthony ............................. 376/442

FOREIGN PATENT DOCUMENTS 1596787  8/1981  United Kingdom ................. 376/452

Primary Examiner—Stephen C. Bentley
Attorney, Agent, or Firm—L. James Ristas

[57] ABSTRACT

An improved nuclear fuel assembly in which the lowermost grid is located close to the lower end fitting of the assembly, and a conventional Zircaloy-clad fuel rod is fitted with a stainless steel tip having a bevelled notch thereon for engaging resilient means on the grid within about one inch (2.5 cm) from the lower tip of the fuel rod. The notch mechanically restrains the fuel rod from lifting upwards during reactor operation, yet is shallow enough to permit removal of the fuel rod in the event reconstitution is required. The stainless steel tip is mechanically secured to the Zircaloy end cap of the fuel rod, and is located in a low importance flux region of the core so that the higher neutron poison absorption cross section of stainless steel is of little consequence. Since the lowermost grid secures each fuel rod within one inch of the lower end of the rod, there is little likelihood that the coolant flowing over the lower ends of the fuel rods will induce significant vibrations.

8 Claims, 7 Drawing Figures

ARRANGEMENT FOR RETAINING A FUEL ROD IN A RECONSTITUTABLE FUEL ASSEMBLY

BACKGROUND OF THE INVENTION

This invention relates to nuclear fuel assemblies, and in particular to an arrangement for retaining nuclear fuel rods in the proper spaced relationship within the assembly.

Fuel assemblies for pressurized water nuclear reactors typically have a lower end fitting to which is connected an elongated frame for vertically and laterally supporting a multiplicity of parallely spaced nuclear fuel rods. The frame includes a plurality of axially spaced grids, each grid defining a multiplicity of openings which are in registry with one another over the longitudinal extent of the fuel assemblies. Each fuel rod passes through an opening in each grid, and is spaced and supported within the grid by resilient means projecting from the grid walls into the openings and against the fuel rod. During operation, a nuclear reactor core typically contains over two hundred fuel assemblies arranged side-by-side so that the lower end fittings rest on a core support stand.

Cooling water is introduced into the lower ends of the assemblies through the lower end fitting. As the water passes upward along the assemblies, a net upward force is applied to the individual fuel rods. This coolant flow over the rods not only tends to lift them upwardly, but also may cause vibrations to begin in the lower, or upstream, end of the rods. Measures must be taken to prevent the fuel rods from vertically rising through the grids and being damaged upon impact against other structures above the assemblies, in the event of a major system malfunction such as a loss of coolant accident. These measures must not be permanent, however, since it is desirable that a fuel assembly be remotely reconstitutable. This requires that individual fuel rods be removable from the assembly in the event that leakage or other defects are encountered during the refueling period but prior to the scheduled permanent removal of the entire fuel assembly.

Furthermore, every effort must be made to minimize the neutron poison effect of structural material in the assembly, and accordingly the type and location of the structure are important considerations. Moreover, materials compatibility is also important particularly in fuel assemblies where the fuel rods are made of Zircaloy and the grids or resilient members on the grids are made from a different material such as Inconel or stainless steel.

SUMMARY OF THE INVENTION

It is accordingly an object of the invention to provide a means for retaining nuclear fuel rods in their designated vertical position within the assembly during core operation, yet permitting the assembly to be reconstituted during refueling. This objective is desirably achieved without increasing the neutron poison absorption in the core and without degrading the resistance to vibration and consequent fretting between the fuel rod and the grids, as compared with conventional assemblies.

According to the present invention, an improved nuclear fuel assembly is provided in which the lowermost grid is located close to the lower end fitting of the assembly, and a conventional Zircaloy-clad fuel rod is fitted with a stainless steel tip having a bevelled notch thereon for engaging resilient means on the grid within about one inch (2.5 cm) from the lower tip of the fuel rod. The notch mechanically restrains the fuel rod from lifting upwards during reactor operation, yet is shallow enough to permit removal of the fuel rod in the event reconstitution is required. The stainless steel tip is mechanically secured to the Zircaloy end cap of the fuel rod, and is located in a low importance flux region of the core so that the higher neutron poison absorption cross section of stainless steel is of little consequence. Since the lowermost grid secures each fuel rod within one inch of the lower end of the rod, there is little likelihood that the coolant flowing over the lower ends of the fuel rods will induce significant vibrations.

DESCRIPTION OF THE PREFERRED EMBODIMENT

Figure 1:
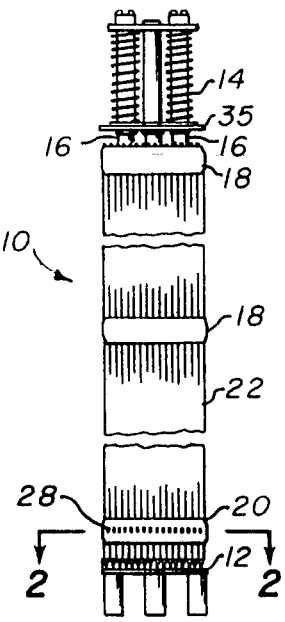
FIG. 1 is an elevation view of a typical prior art pressurized water nuclear reactor fuel assembly.

FIG. 1 shows a typical pressurized water nuclear fuel assembly 10 having a lower end fitting 12 and an upper end fitting 14 which are connected by a plurality of control rod guide tubes 16, typically in the form of cylindrical tubes running the full length of the assembly 10. A plurality of axial spaced grids 18, 20 are rigidly connected to the guide tubes 16 and extend perpendicularly thereto. The end fittings 12, 14, guide tubes 16, and grids 18, 20 form the structural skeleton of the fuel assembly 10. Supported by the skeleton are a multiplicity of parallely disposed Zircaloy-clad fuel rods 22 which are maintained in spaced relationship by the grids 18, 20. At least one end of each fuel rod, typically the upper end, is free to expand and contract during reactor operation.

Figure 2:
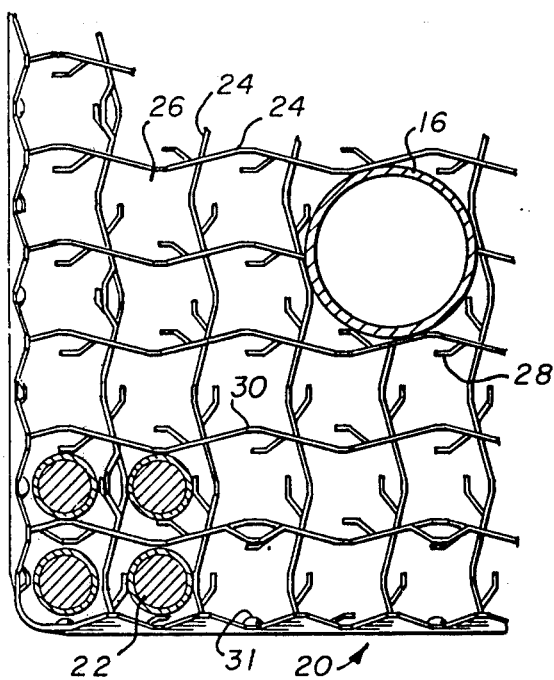
FIG. 2 is a cross section taken along the lines 2—2 of FIG. 1, showing a typical fuel assembly grid.
Figure 3:
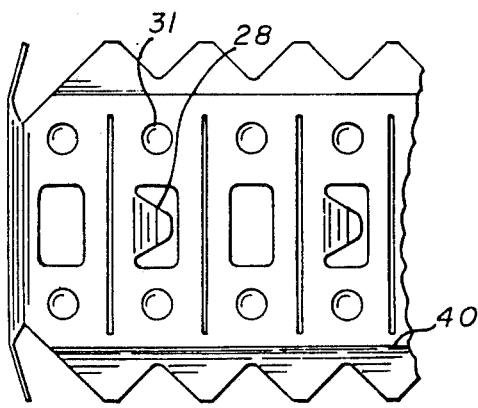
FIG. 3 is an elevation view of the grid of FIG. 2.

FIG. 2 shows in greater detail the bottom grid 20 taken along the section represented by line 2—2 in FIG. 1. The grid 20 is an egg-crate arrangement of interlaced strips 24 which define a multiplicity of grid openings 26 through which individual fuel rods 22 penetrate the grid. The strips 24 typically have resilient means such as cantilevered springs 28 projecting into each of the openings 26 whereby each fuel rod 22 is firmly supported in both the lateral and longitudinal direction. As shown in FIG. 3, the springs 28 may be punched out of the strip 24. As illustrated in FIGS. 2 and 3, the strips 24 also have arches 30 or dimples 31 projecting into the openings 26 such that the fuel rods 22 may be supported on two sides by the resilient means 28 and on two sides by hard surfaces.

Figure 4:
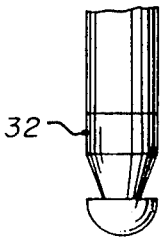
FIG. 4 is an enlarged view of one type of prior art fuel rod end cap.

The prior art has provided two kinds of bottom grid fuel support. The earlier kind has a locking-type interaction between the bottom grid and the lower ends of the all Zircaloy fuel rods. These retention grids are similar in cross section to the grid illustrated in FIGS. 2 and 3, with the resilient means 28 located close to the assembly lower end fitting. The resilient means are very stiff and often made of Inconel, in order to lock into deep notches provided on the end caps 32 of the fuel rods, as shown in FIG. 4. The locking of the fuel rod to the assembly skeleton prevents the rods from "floating" upwardly through the grids and, particularly in the event of a severe accident, from projecting out of the assembly. This could severely distort or even break the fuel rod, spewing radioactive fission products into the coolant.

Although the prior art retention concept described immediately above was successful in holding the fuel rods within the retention grid, the relatively permanent attachment of the fuel rod to the retention grid greatly hindered the ability to reconstitute the fuel assembly during refueling of the core. A typical fuel assembly is intended to reside in the core for a total of three cycles, each approximately one year in length. Between cycles, the reactor vessel is opened and the fuel assemblies are shuffled, with those that have resided for three years being permanently removed, the others being shuffled, and a new group of assemblies inserted for the first time. During refueling the fuel assemblies are inspected to determine whether any fuel rods have leaks. Sometimes fuel assemblies that are not ready to be permanently removed from the reactor contain one or two fuel rods which are found to leak. It is desired that such assembly be reconstitutable, i.e., that leaking rods may be removed and replaced with fresh rods.

Figure 5:
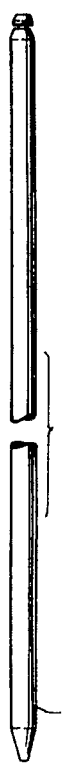
FIG. 5 is an enlarged elevation view of another typical prior art fuel rod.

Thus the conventional retention grids make reconstitution extremely difficult, particularly because the replacement of the individual fuel rods must be made remotely under water Accordingly, more recently the design for lower grids has substituted a spacer-type grid for the retention grid at the bottom of the assembly, as shown in FIGS. 1 and 5. The lowermost or bottom spacer grid 20 may be made of Inconel or have Inconel or other stiff springs 28 which, as in the other grids 18, interact with the smooth surface of the fuel rod cladding, at an elevation such as shown at 33 on FIG. 5. As shown in FIG. 1, the upper ends of the fuel rod are spaced from the upper end plate 35 to accommodate the substantial growth and expansion that may occur during reactor operation. Since the lower ends of the fuel rods are not locked into place, the possibility exists that under extremely adverse conditions the fuel rod could be lifted up from the lower end fitting and, particularly early in the cycle when the fuel rods have not yet elongated to a substantial degree, the fuel rod may rise within the assembly and come into contact with the upper end plate 35. To assure that the fuel rod does not thereby become disengaged from the lower grid 20, the resilient means 28 on the lower grid 20 are provided several inches (up to about 10 cm) from the lower end fitting 12 on which the ends of the fuel rods 22 normally rest. This arrangement, however, in effect cantilevers the lower ends of the fuel rods 22 and promotes unwanted vibration since the lower ends of the fuel rod are not directly restrained from vibrating. Until the present invention, the cantilevered lower ends of the fuel rods 22 are tolerated in order to provide an expansion space between the upper ends of the fuel rods and the upper end plate 35, and to permit reconstitution of the fuel assembly, which was easily accomplished because none of the grids 18, 20 locked the fuel rods.

Figure 7:
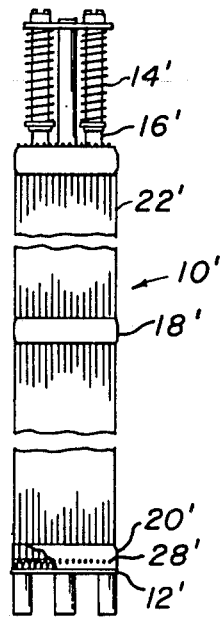
FIG. 7 is an elevation view of a fuel assembly showing the bottom grid location in accordance with the present invention.
Figure 6:
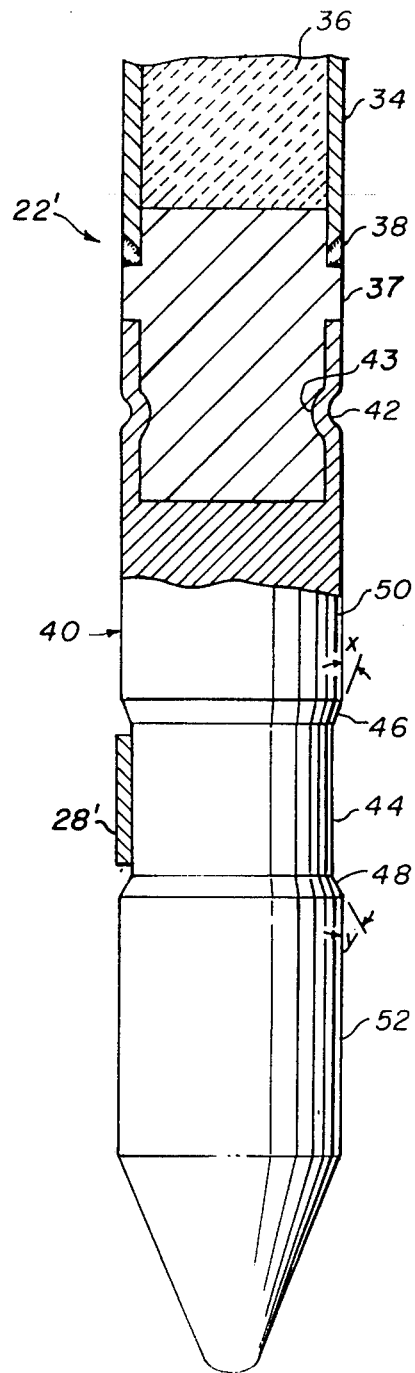
FIG. 6 is an enlarged view of the end cap and tip for a fuel rod in accordance with the present invention.

According to the invention, illustrated in FIGS. 6 and 7, a new end cap and tip arrangement is provided on the all Zircaloy fuel rod 22' whereby the benefits of a retention-type bottom grid and the capability of fuel assembly reconstitution are simultaneously available for the first time. These benefits are achieved by providing the bottom grid 20' with resilient members 28' at an elevation, preferably one to two inches (2.5–5.0 cm) from the lower end fitting 12', opposite the novel fuel rod tip whereby the rod is firmly secured at its end to prevent unwanted upward "floating" and to eliminate the cantilevered support which promoted undesirable vibration. The interaction of the resilient means with the rod tip, however, is controlled to permit removal of the rod with tools conventionally used for reconstituting the assembly.

Referring now to FIG. 6, a fuel rod 22' is shown having a Zircaloy-clad portion 34 in which are contained a stack of fissionable fuel pellets 36. A double-ended solid Zircaloy plug 37 is welded at 38 to the cladding 34 to seal the end of the tube. A generally cylindrical stainless steel tip 40 is mechanically secured to the plug 37, preferably by a hydroformed circumferential crimp 42 which fits into a circumferential groove 43 provided in the plug 37. The stainless steel tip 40 has, intermediate the ends, a circumferential, indented retention notch 44. The bevelled transition 46 from the upper portion of the tip 40 to the notch 44 forms an angle x approximately 15°–30° from the vertical and is preferably 20°. The notch 44 has a bevelled transition 48 to the lower portion of the tip at a larger angle y, typically 20°–40° and preferably about 30°.

During fuel assembly fabrication before shipment to the reactor site, the upper end fitting 14' (see FIG. 7) is not yet secured to the remainder of the skeleton so that the individual fuel rods 22' can be inserted from above into each of the grids 18', 20'. As the rod tip 40 approaches the bottom grid 20' the notch 44 is forced through the resilient means 28' until the rod touches the lower end fitting plate 12'. The resilient means 28' on the grid strips 24 (see FIG. 2) are at an elevation such that when the rods rest on the lower end fitting 12', the resilient means 28' are adjacent to and provide a bias on the notch 44. Once the bias means or springs 28' are in the notch 44, upward movement of the rod 22 is inhibited by the transition region 48 due to the mechanical interaction between the resilient means 28' and the bevelled surface.

Angle x is chosen so that as the fuel rod tip 40 passes downward through each grid 18' during fabrication, the transition region 46 is shallow enough to permit relatively easy overpowering of the resilient means. Thus the fuel rod tip 40 will not stick in an intermediate assembly grid 18'. Angle y is chosen to be sufficiently steep so that the fuel rod tip 40 will stick when moved upwardly through the grids, particularly the bottom grid 20' which is preferably provided with stiffer springs 28' than are the other grids 18'. The easiest way to provide a stronger holding effect with grid 20' than with the other grids 18' is to preset the springs 28' with a greater initial deflection toward the center of the opening 26 (see FIG. 2).

In the preferred embodiment, two spring tabs 28 project into every opening 26 so that the fuel rod tip 40 will be secured by two separate resilient tabs 28. As shown on FIGS. 2 and 3, the strips may also include arches 30 or other projections 31 which provide a hard surface against which the fuel rods may be urged. These arches 30 or projections 31 are spaced vertically above and below the spring tabs 28 and accordingly would interact with the fuel rod tip 40 at points above and below the notch 44, as indicated generally at 50 and 52 on FIG. 6.

The present invention achieves substantial benefits in rather subtle fashion. As compared with the prior art bottom grid 20 shown in FIG. 1, the present invention permits the interlaced strips 24 to be placed farther away from the center of the core, which has the benefit of reducing the parasitic neutron absorption resulting from the presence of grid material in the core. Furthermore, this permits the use of an Inconel grid as the bottom grid 20', Inconel providing a stronger spring rate for the resilient means 28 whereby the fuel rod may be more strongly held by the grid. Since Inconel is a much stronger parasite than Zircaloy, Inconel would not normally be used if the grid 20 were located along the fuel rod cladding substantially above the lower end fitting 12 as shown in FIG. 1. With the present invention, however, Inconel can be tolerated because the strips 24 are at the tips of the fuel rods.

Although Inconel is desirable for the bottom grid 20 because of its greater biasing strength, a normal all-Zircaloy fuel rod could be severely fretted or even perforated if the Inconel were to interact against a Zircaloy fuel rod surface. Accordingly, with the present invention the tip 40 is made of stainless steel which not only is less expensive than Zircaloy but also superior with respect to compatibility with the Inconel spring 28. Zircaloy is not weldable to stainless steel, however, and accordingly the inventive fuel rod provides a Zircaloy plug 37 which is welded at 38 to the Zircaloy tube 34.

If the assembly is to be reconstituted, during refueling the upper portion of the assembly skeleton is removed according to known techniques and the defective fuel rods 22' are pulled upwardly through the grids 18', 20'. The fuel rod tip 40 of the present invention provides some resistance to the upward force on the fuel rod, but the bevelled transition region 46 is readily overpowered by conventional reconstitution techniques so that the fuel rod may be removed without damage. Furthermore, the mechanical joint 42 has been found to be quite strong and accordingly there is no danger that the tip 40 would detach from the remainder of the fuel rod.

As shown in FIG. 7, an additional advantage of the invention relative to the reconstitutable assembly shown in FIG. 1, is that the upper end plate 35 may be eliminated since the fuel rods 22 are retained within the lower grid 20' tightly enough to preclude disengagement even under accident conditions.

I claim:

1. A nuclear fuel assembly having a horizontal lower end fitting, an elongated frame rigidly connected to the lower end fitting and extending vertically therefrom, the frame including a plurality of longitudinally spaced apart horizontal grids, each grid formed from a plurality of interconnected metal strips defining a multiplicity of openings and having resilient means projecting laterally into each opening, and a multiplicity of longitudinally disposed, parallel fuel rods each passing through an opening in every grid and maintained in vertical and horizontal position by the resilient means, the fuel rods formed of Zircaloy tubes sealed at each end with Zircaloy caps wherein the improvement comprises:

each fuel rod having a generally cylindrical, stainless steel tip mechanically joined to the Zircaloy cap, the tip having an indented retention notch extending between axially spaced, bevelled surfaces for engaging the resilient means on the lowermost grid.

2. The fuel assembly of claim 1 wherein the cap is a solid double-ended Zircaloy plug welded at its upper end to the fuel rod cladding.

3. The fuel assembly of claim 1 or 2 wherein the notch is a cylindrical neck intermediate the ends of the tip.

4. The fuel assemblies of claim 1 or 2 wherein the resilient means on the lowermost grid are located between one and two inches (2.5–5.0 cm) from the lower end fitting.

5. The assembly of claim 2 wherein the lower portion of the plug includes a circumferential groove and the upper portion of the tip closely fits around the lower portion of the plug and is circumferentially deformed into the groove to form an interference fit between the tip and the plug.

6. The fuel assembly of claim 2 wherein the upper bevelled surface makes an angle with the vertical of between 15° and 30°, and the lower bevelled surface makes an angle with the vertical of between 20° and 40°.

7. The fuel assembly of claim 3 wherein the lowermost grid has hard stops projecting into each passage above and below the resilient means and contact the tip above and below the notch.

8. The fuel assembly of claim 4 wherein the upper bevelled surface angle is about 20° and the lower bevelled surface angle is about 30°.

* * * * *